(12) United States Patent
Heidenreich

(10) Patent No.: US 6,342,162 B1
(45) Date of Patent: Jan. 29, 2002

(54) REMOVAL OF HEAVY METAL IONS FROM AQUEOUS MEDIA

(75) Inventor: Holger Heidenreich, Quarnbek/Flemhude (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/582,786

(22) PCT Filed: Dec. 29, 1998

(86) PCT No.: PCT/EP98/08488

§ 371 Date: Jul. 3, 2000

§ 102(e) Date: Jul. 3, 2000

(87) PCT Pub. No.: WO99/35094

PCT Pub. Date: Jul. 15, 1999

(30) Foreign Application Priority Data

Jan. 10, 1998 (DE) .......................................... 198 00 699

(51) Int. Cl.$^7$ .................................................. C02F 1/52
(52) U.S. Cl. ........................ 210/719; 210/723; 210/757; 210/912; 210/914
(58) Field of Search ................................ 210/719, 723, 210/757, 912, 914

(56) References Cited

U.S. PATENT DOCUMENTS 3,873,581 A * 3/1975 Fitapatrick et al.
4,705,638 A   11/1987 Ganczarczyk ............... 210/710
6,153,108 A * 11/2000 Klock et al.

FOREIGN PATENT DOCUMENTS

| DE | 4229662 | 3/1994 |
| EP | 0 550 967 | 7/1993 |
| WO | 94/07800 | 4/1994 |

OTHER PUBLICATIONS

Perkow et al, Chem.–Ing.–Tech. 52 (month unavailable) 1980, No. 12, pp. 943–951, Nassoxidation—Ein Beitrag zum Stand der Technik.

* cited by examiner

*Primary Examiner*—Betsey Morrison Hoey
(74) *Attorney, Agent, or Firm*—Joseph C. Gil; Diderico van Eyl

(57) ABSTRACT

Process for removing heavy metal ions from aqueous media, characterized in that, to precipitate out the heavy metal ions, a sulphide precipitation is carried out in the presence of iron oxide.

6 Claims, No Drawings

REMOVAL OF HEAVY METAL IONS FROM AQUEOUS MEDIA

The invention relates to a process for removing heavy metal ions, in particular mercury ions and silver ions, from aqueous media.

Organically polluted wastewaters, i.e. wastewaters comprising organic compounds, may be cleaned up in various manners. One possibility is to concentrate the wastewater and then incinerate the residue. Another possibility is that the wastewater is subjected to an oxidative treatment (what is termed wet oxidation) (H. Perkow, R. Steiner, H. Vollmüller, Chem.-Ing.-Tech. 52 (1980) No. 12, pp.943–951). The latter procedure is particularly suitable for cleaning up salty wastewaters, since the salt can be taken off in advance in various ways from the aqueous phase.

In addition to the organic load, heavy metal ions, particularly mercury ions and silver ions, are frequently present in wastewaters, in which case these must be removed virtually without residue.

Thus, the removal of mercury ions from exhaust gas streams using ion-exchangers is described, for example in EP-A-550 967. However, a disadvantage in this case is the use of expensive operating media. In addition, according to DE-A-4 229 662, the removal of mercury ions via sulphide precipitation when relatively large amounts of mercury are present is mentioned. However, the relatively poor filterability of the resulting mercury sulphides is problematic in this case, especially if the amounts of heavy metals are very small, in particular in the range of a few milligrams per liter.

The object which therefore underlay the present invention was to provide an improved process for removing heavy metal ions from aqueous media.

A process has now been found for removing heavy metal ions, in particular mercury ions and silver ions, from aqueous media, which is characterized in that, to precipitate out the heavy metal ions, a sulphide precipitation is carried out in the presence of iron oxide.

The heavy metal ions to be precipitated out are dissolved heavy metal salts. which are precipitated out in the form of their sulphides in the sulphide precipitation.

Preferably, for the sulphide precipitation, use is made of a water-soluble sulphide, water-soluble preferably being taken to mean a solubility in water at 20° C. greater than or equal to 100 g/l, in particular greater than 300 g/l. Particularly preferred sulphides used are, for example, hydrogen sulphide, alkali metal sulphide, in particular sodium sulphide, alkali metal hydrogen sulphide, in particular sodium hydrogen sulphide or mixtures thereof.

The sulphide used for the sulphide precipitation is preferably used stoichiometrically or in stoichiometric excess, based on the heavy metal cation to be precipitated. The sulphide precipitation is preferably carried out at a temperature of 20 to 155° C. It can be carried out at atmospheric pressure or at elevated pressure, preferably at 1 to 6 bar.

It is likewise preferred to carry out the sulphide precipitation in acids, in particular at a pH from 0.5 to2.5.

The process according to the invention is preferably carried out in the presence of an iron oxide compound selected from the group consisting of $FeO$, $Fe_2O_3$ and $Fe_3O_4$ or mixtures thereof. The amount by weight of the iron oxide is preferably 5 to 500, in particular 5 to 100, mg/l of wastewater.

In a particularly preferred embodiment of the process according to the invention, as aqueous medium, use is made of the wet-oxidation product of iron- and heavy-metal-containing water having an organic compound content, expressed in TOC (total organic carbon), of up to 50 g/l, preferably 15 to 20 g/l, this water fed to the wet oxidation possibly containing inorganic salts and having a pH of in particular 5.5 to 8.0. The inorganic salt content is preferably 0 to 15% by weight, based on the iron-containing water. The iron content of the water fed to the wet oxidation is preferrably present as iron sulphate in the amount of 5 to 500 mg/l, particularly preferably 10 to 100 mg/l.

During the wet oxidation, preferably, the wastewater is pumped by a high-pressure pump through a heat exchanger in which the wastewater is preheated in countercurrent by the cleaned-up wastewater. On entry into the reactor, the temperature should be sufficiently high so that the oxidation preferably carried out with air is initiated. From a TOC content of 10,000 to 20,000 mgl, the oxidation can proceed autothermally without using additional energy. Since oxidation in the gas phase generally proceeds very slowly under the temperature conditions of wet oxidation, care is taken to ensure that preferably at least some of the water in the reactor is present in liquid form, preferably by establishing a pressure which is above the saturated vapour pressure at the corresponding temperature.

To reduce corrosion problems and the associated considerable equipment costs by lowering the reaction temperature, to accelerate the reaction, a catalyst is preferably added. As catalyst, use is made in particular of subgroup metals.

Preferred catalysts are taken to mean, in the context of this invention, divalent catalytically active copper ions, preferably, copper sulphate or copper sulphide being used. The copper catalyst is preferably used in an amount of 100 to 1000 mg/l, particularly preferably 200 to 700 mg/l. Preferably, the wet oxidation is carried out at a temperature of 240 to 280° C., it being advantageous to establish a pressure of 100 to 200 bar.

In a liquid separator, the cleaned-up wastewater and the low-oxygen exhaust gas are preferably separated from one another.

Because of the strong fungicidal, algicidal and bactericidal action of copper ions, the catalyst is preferably precipitated as sulphide, separated off and recycled to the wet oxidation process, where it is again oxidized to copper sulphate.

The wet-oxidation reaction products, depending on reaction conditions, are carbon dioxide and water together with small amounts of partially oxidized, low-molecular-weight fragments of poorly degradable organic compounds. The nitrogen content of organic compounds is very largely converted into ammonia, which is stripped from the cleaned-up acidic wastewater after pH adjustment.

If the iron oxide required for the sulphide precipitation originates from the stage of the wet oxidation of an iron-containing aqueous medium, it can be advantageous to add polyelectrolytes to this solution or suspension after the wet oxidation, i.e. before or preferably after the sulphide precipitation. Polyelectrolytes which may be mentioned are, for example, salts of polyphosphoric acid, polyvinylsulphuric acid, polyvinylsulphonic acid, polyvinylphosphonic acid, polyacrylic acid, polyethyleneimines, polyvinylamines, polyvinylpyridines etc. The polyelectrolytes can be used, for example, in an amount of 0.0001 to 0.1% by weight, based on the suspension or solution. The aqueous medium used for the wet oxidation has a pH, in particular, of 5.5 to 8.0. The heavy metal sulphides formed, in particular mercury sulphide, silver sulphide but also copper sulphide, for example if it has been used as catalyst in an upstream wet-oxidation reaction, can then be seperated off together.

Heavy-metal-ion depleted wastewaters obtained by the process according to the invention preferably have a residual heavy metal content of less than 1 mg/kg of copper or silver and less than 0.005 mg/kg of mercury.

In a very particularly preferred embodiment of the process according to the invention, mercury ions in the presence of copper ions are separated off by sulphide precipitation, characterized in that the water-soluble sulphide is used in a stoichiometric amount or in excess, preferably from 1.0 to 2.0 molar equivalents, preferably from 1.0 to 1.5 molar equivalents, per equivalent of mercury ions.

In the course of this, mercury sulphide preferably precipitates, the majority of copper ions remaining in solution. The mercury sulphide precipitated out can then be separated off together with iron oxide.

Following this, it is preferred to separate off the dissolved copper ions, which preferably correspond to the copper catalyst of an upstream wet-oxidation step, by sulphide precipitation. The copper sulphide separated off can then be reused, for example, as catalyst in the wet-oxidation process, where it is then oxidized to the soluble copper sulphate.

EXAMPLE 1

30 m$^3$/h of a neutralized wastewater of the composition below are oxidized continuously with air in a high-pressure wet-oxidation reactor at 250° C. and 150 bar pressure.
Composition:

15,000 mg/l of TOC 9.9% sodium sulphate 410 mg/kg of copper 29 mg/kg of iron 0.28 mg/kg of mercury density 1.18 metric t/m$^3$ After the wet oxidation, the wastewater cleaned up to a residual TOC content of 350 mg/l (degree of clean-up of 97.6%) is cooled, with preheating of the reactor feed, expanded under high pressure - separation of the cleaned-up wastewater and the low oxygen exhaust gas—and the finely divided iron oxide is continuously separated off via sand filter and filter press. The acidic wastewater (pH approximately 2.0) is continuously admixed with a 30% strength sodium hydrogen sulphide solution (approximately 37 l/h; end-point detection via redox potential measurement), whereupon the precipitated copper sulphide is decanted off in order to recycle it as catalyst suspension for the wet-oxidation process upstream of the reactor. Finely divided mercury sulphide which is coprecipitated under these conditions is thus in part likewise returned to the catalyst circuit and concentrates therein, without it being able to be ejected, and in part it remains finely divided in the wastewater (mercury concentration in the cleaned-up wastewater 0.2 mg/kg).

EXAMPLE 2

30 m$^3$/h of a neutralized wastewater of the composition below are oxidized continuously with air in a high-pressure wet-oxidation reactor at 250° C. and 150 bar pressure.
Composition:

15,000 mg/l of TOC 9.9% sodium sulphate 410 mg/kg of copper 29 mg/kg of iron 0.36 mg/kg of mercury density 1.18 metric t/m$^3$ After the wet oxidation, the wastewater (pH 2.0) cleaned up to a residual TOC content of 350 mg/l (degree of clean-up of 97.6%) is cooled, with preheating of the reactor feed, expanded from high pressure—separation of the cleaned-up wastewater and the low-oxygen exhaust gas—and continuously admixed, via a fine-stream metering pump, with 14 ml/h of a 30% strength sodium hydrogen sulphide solution. After a residence time of approximately 1 hour, the precipitated mercury sulphide is continuously separated off together with the finely divided iron oxide via sand filter and filter press. The filtrate substantially freed from mercury is then, to separate off the copper catalyst, continuously admixed with a 30% strength sodium hydrogen sulphide solution (approximately 37 l/h; end-point detection via redox potential measurement), whereupon the precipitated copper sulphide is decanted off, in order to recycle it upstream of the reactor as catalyst suspension for the wet-oxidation process. After the HgS/CuS separation, <0.005 mg/kg of mercury is present in the cleaned-up wastewater.

EXAMPLE 3

The wastewater from Example 2 is subjected to wet oxidation as described above and, to precipitate the mercury, is admixed with a 30% strength sodium hydrogen sulphide solution. To accelerate and complete the iron oxide precipitation, the wastewater receives 30 l/h of an aqueous 0.1% strength mixture of a cationic high-molecular-weight polyacrylamide copolymer. The then readily filterable iron oxide is separated off, as described above, together with the precipitated mercury sulphide. Then, as described in Example 2, the procedure is continued with the catalyst separation. The cleaned-up wastewater, after the HgS/CuS separation, comprises <1 mg/kg of copper and <0.002 mg/kg of mercury.

What is claimed is:

1. A process for removing heavy metal ions from aqueous media comprising precipitating heavy metal ions from the aqueous media by sulphide precipitation in the presence of iron oxide and copper ions at a pH of 0.5 to 2.5.

2. The process according to claim 1, wherein mercury ions are removed from the aqueous media.

3. The process according to claim 1, wherein the sulphide precipitation is carried out with a sulphide having a water solubility greater than or equal to 100 g/l at 20° C.

4. The process according to claim 1, wherein the sulphide is selected from the group consisting of hydrogen sulphide, alkali metal sulphide, alkali metal hydrogen sulphide, and mixtures thereof.

5. The process according to claim 1, wherein the sulphide precipitation is carried out in the presence of 5 to 500 mg/l of iron oxide.

6. The process according to claim 1, wherein the aqueous medium comprises a wet-oxidation product of iron and heavy-metal-containing water having a TOC content of up to 50 g/l.

* * * * *